June 29, 1937.   J. N. GOURLEY   2,085,312
TRACTOR
Filed July 29, 1935   2 Sheets-Sheet 1

JAMES N. GOURLEY
INVENTOR.

ATTORNEYS.

June 29, 1937.    J. N. GOURLEY    2,085,312
TRACTOR
Filed July 29, 1935    2 Sheets—Sheet 2

JAMES N. GOURLEY.
INVENTOR

Patented June 29, 1937

2,085,312

UNITED STATES PATENT OFFICE 2,085,312

TRACTOR

James N. Gourley, Portland, Oreg., assignor to Kultor King Incorporated, Portland, Oreg.

Application July 29, 1935, Serial No. 33,690

1 Claim. (Cl. 180—19)

This invention relates to improvements in tractors and more especially to the two-wheel type of tractor particularly well adapted for manual operation in orchards, small gardens, and the like.

The principal object of the invention is the provision of a tractor of this character which is of relatively small size, powerful, easily maneuverable, and well balanced by having its center of gravity disposed immediately above the single axle.

Another object of the invention is the provision of a tractor of this character which may be completely controlled by an operator at a point remotely disposed from the power plant of said tractor.

These and other objects will appear as my invention is more fully hereinafter described in the following specification, illustrated in the accompanying drawings, and finally pointed out in the appended claim.

Figure 1:
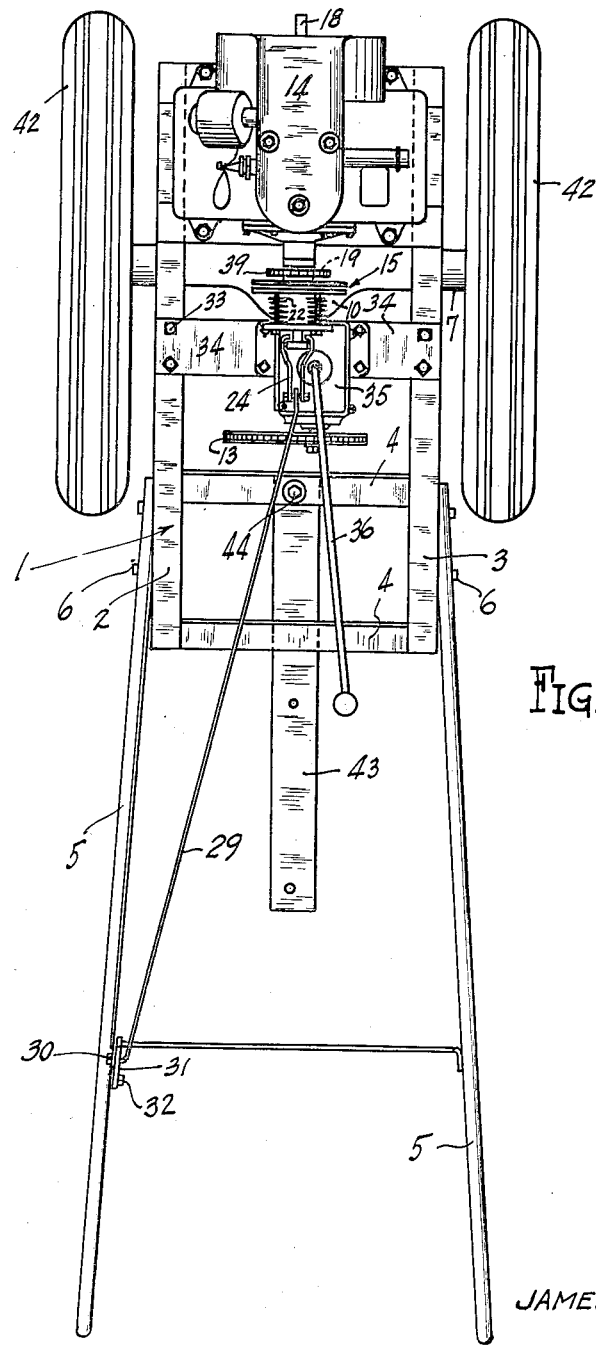
Figure 1 is a top plan view of my new and improved tractor.

Referring now more particularly to the drawings:

Reference numeral 1 indicates generally the main body, or frame, of my tractor, which comprises a pair of channel members 2 and 3 held apart in proper spaced relation by spacer elements 4 in the form of angle irons, as shown.

To one end of the frame 1 I secure a pair of handles 5 which are bolted as at 6 to the frame and extend outwardly therefrom in a manner similar to the handles of other farm implements.

The frame is secured to an axle housing 7 by means of shackle bolts 8 which are secured as at 9 to the frame. The axle 9A within the housing 7 is operatively interconnected with any approved form of differential contained within a housing 10. A drive shaft 11 extends outwardly from the housing 10 and is provided with a sprocket wheel 12 which is embraced by a sprocket chain 13.

Superimposed upon the frame 1 is any approved type of internal combustion engine 14 which is provided with a friction clutch 15 consisting of friction plates 16 and 17.

The disc 17 is secured to the drive shaft 18 of the engine and rotates with it, while the disc 16 and sprocket wheel 19, secured thereto, idle on the shaft. Extending rearwardly from the disc 17 are a plurality of rods 20 which support a disc 21 which is slidably mounted upon the engine drive shaft 18. Interposed between the discs 17 and 21, and carried by the rods 20, are a plurality of compression springs 22 adapted to yieldingly apply operating pressure on the discs of the clutch. The engine drive shaft 18 extends entirely through the disc 21 and to its outermost end is secured a ball-bearing 23 which is embraced by a pair of arms 24. The opposite ends of these arms pivotally embrace a lever 25 which is pivoted at its lower end, as at 26, to a bracket 27. The upper end of the lever 25 pivotally connects, as at 28, with a link 29 whose opposite end pivotally connects, as at 30, with an operating lever 31. The lever 31 is pivoted to one of the handles as at 32. By moving the lever 31 forwardly or rearwardly the clutch may be engaged or disengaged.

Extending transversely of the frame 1 and mounted thereupon by means of bolts 33 are a pair of supporting plates 34 upon which I mount a transmission unit 35 having the usual shifting lever 36. One operating shaft 37 of the transmission unit is provided with a sprocket wheel 38 which is operatively interconnected, by means of a sprocket chain 39, with the sprocket wheel 19, so that upon engagement of the clutch 15 rotary motion will be imparted to the shaft 37 of the transmission unit. The other, or driven, shaft 40 of the transmission unit is provided with a sprocket wheel 41 which is embraced by the sprocket chain 13 to impart rotary motion to the drive shaft 11 and to traction wheels 42 secured to the ends of the axle 9A.

Figure 2:
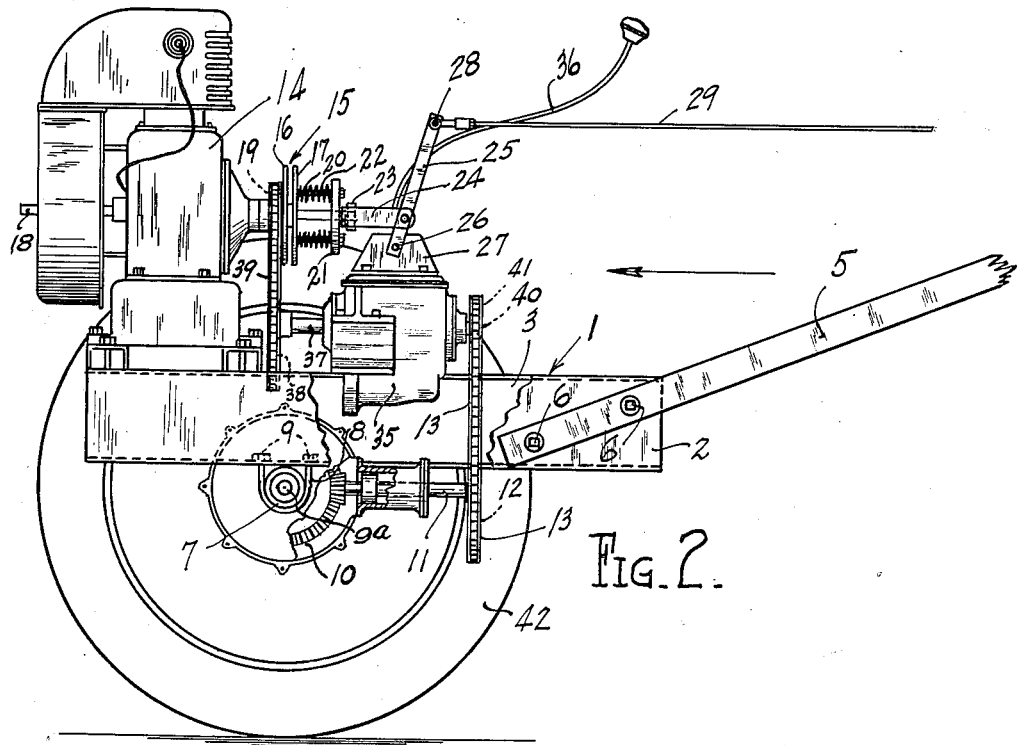
Figure 2 is a side elevation of Figure 1, with parts broken away for convenience of illustration.
Figure 3:
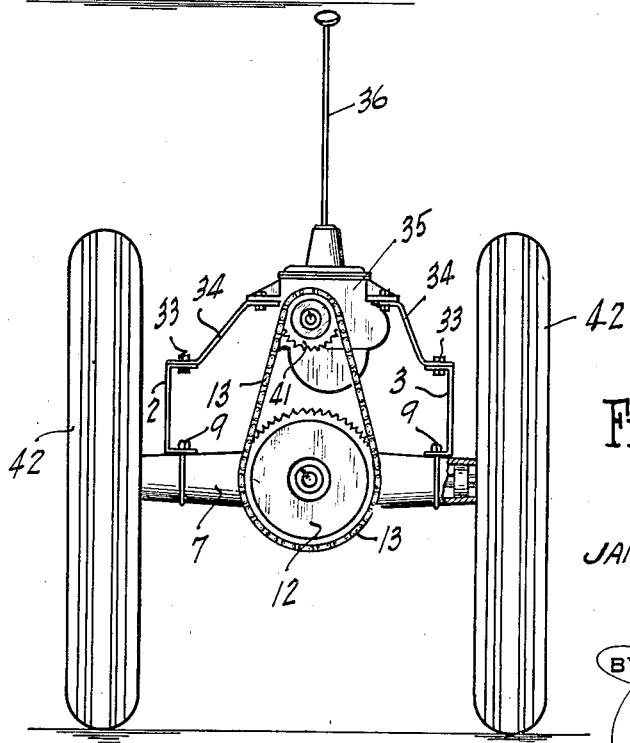
Figure 3 is an end elevation, looking in the direction of the arrow in Figure 2, with parts omitted for convenience of illustration.

The balanced arrangement of the various elements of the invention is best illustrated in Figure 2 wherein it will be seen that the weight is equally distributed on both sides of the axle, thus establishing the center of gravity immediately above the axle and thereby applying little or no load on the handles of the operator.

For convenience in attaching my tractor to articles to be dealt with, such as trailers, plows, harrows, and similar farm implements, I provide a draw bar 43 which is pivotally connected as at 44 to one of the spacer elements 4.

While I have shown and described a particular form of embodiment of my invention, I am aware that many minor changes therein will readily suggest themselves to others skilled in the art without departing from the spirit and scope of the invention. Having thus described my invention, what I claim as new and desire to protect by Letters Patent, is:—

A two-wheel tractor comprising a pair of traction wheels operatively interconnected by an axle driven through a differential disposed centrally of the axle, said axle and differential being disposed within housings, an elongated frame superimposed upon the axle housing and secured substantially at its center to said housing, a pair of operating handles secured to and extending outwardly from one end of said frame whereby the frame and its related parts may be rocked about the axle, an engine and selectively operable geared power transmission means operatively interconnected and mounted upon the frame, a clutch interposed between said engine and one end of said transmission means, a sprocket wheel operatively engaged with the opposite end of the power transmission means, a sprocket wheel operatively engaged with said differential and disposed below said frame, and a sprocket chain operatively embracing both of said sprockets.

JAMES N. GOURLEY.